US012046578B2

(12) United States Patent
Zaman et al.

(10) Patent No.: US 12,046,578 B2
(45) Date of Patent: Jul. 23, 2024

(54) STACKED DIE NETWORK INTERFACE CONTROLLER CIRCUITRY

(71) Applicant: Intel Corporation, Santa Clara, CA (US)

(72) Inventors: Naveed Zaman, Saratoga, CA (US); Aravind Dasu, Milpitas, CA (US); Sreedhar Ravipalli, Cupertino, CA (US); Rakesh Cheerla, Cupertino, CA (US); Martin Horne, Alamo, CA (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 16/914,164

(22) Filed: Jun. 26, 2020

(65) Prior Publication Data

US 2020/0328192 A1  Oct. 15, 2020

(51) Int. Cl.
*H01L 25/065* (2023.01)
*H04L 9/40* (2022.01)
*H04L 47/10* (2022.01)
*H04L 49/90* (2022.01)

(52) U.S. Cl.
CPC .......... *H01L 25/0657* (2013.01); *H04L 47/10* (2013.01); *H04L 49/90* (2013.01); *H04L 63/1458* (2013.01)

(58) Field of Classification Search
None
See application file for complete search history.

(56) References Cited

U.S. PATENT DOCUMENTS

| | | | |
|---|---|---|---|
| 6,393,483 B1 | 5/2002 | Latif et al. | |
| 6,956,853 B1 | 10/2005 | Connery et al. | |
| 8,719,753 B1* | 5/2014 | Chow | H01L 25/0657 |
| | | | 716/139 |
| 8,805,948 B2 | 8/2014 | Boucher et al. | |
| 9,674,090 B2 | 6/2017 | Caulfield et al. | |
| 10,673,440 B1* | 6/2020 | Camarota | G06F 7/483 |
| 2014/0180904 A1 | 6/2014 | Parsons et al. | |
| 2016/0381189 A1 | 12/2016 | Caulfield et al. | |
| 2019/0043536 A1 | 2/2019 | Weber et al. | |
| 2019/0044519 A1* | 2/2019 | Atsatt | H03K 19/17772 |
| 2019/0230049 A1* | 7/2019 | Clark | H04L 49/15 |

OTHER PUBLICATIONS

Extended European Search Report for Application No./Patent No. 20210908.8-1224 mailed May 21, 2021.

* cited by examiner

*Primary Examiner* — Anh Q Tran
(74) *Attorney, Agent, or Firm* — Flecther Yoder, P.C.

(57) ABSTRACT

A smart network interface controller (NIC) implemented using a stacked die configuration is provided. The NIC may include user-customizable networking circuits formed in a top programmable die and primitive network function blocks formed in a bottom application-specific integrated circuit (ASIC) die. The top programmable die may provide a flexible packet processing pipeline to facilitate efficient control and data communication between the user-customizable networking circuits and the primitive network function blocks. The bottom ASIC die may also include an array of memory blocks operable as lookup tables and intermediate buffers for other network processing circuitry in the NIC. A NIC configured in this way provides both performance, power, and area benefits and superior customer configurability.

31 Claims, 9 Drawing Sheets

STACKED DIE NETWORK INTERFACE CONTROLLER CIRCUITRY

BACKGROUND

This relates to integrated circuits, and more particularly, to integrated circuits used to implement network interface cards.

Conventional network interface cards are typically implemented either as an application-specific integrated circuit (ASIC) die or as a field-programmable gate array (FPGA) die. The ASIC implementation provides performance, power, and area advantages but its customized nature for a specific use is oftentimes not flexible enough to support a wide range of different customer requirements. The FPGA implementation provides more configurability to meet different customer requirements but at the cost of decreased performance, more power consumption, and increased area/cost.

It is within this context that the embodiments described herein arise.

DETAILED DESCRIPTION

The present embodiments relate to a network interface controller (NIC) implemented using a programmable integrated circuit die stacked on top of an application-specific integrated circuit (ASIC) die. This stacked die configuration combines the benefits of both ASICs and programmable logic devices (PLDs) by using the programmable interconnect fabric in the top programmable die to implement customer-specific requirements and forming static fixed functional blocks on the bottom ASIC die (e.g., a highly flexible packet processing pipeline can be implemented using the programmable fabric of the top die, whereas stable, high area, and high power consumption blocks can be implemented as hardened blocks on the bottom die without burdening the general purpose programmable fabric on the top die).

By stacking the programmable die directly on top of the ASIC die, close coupling between the two dies can be achieved, which enables efficient inter-block control and data communication between the two dies. The bottom (base) die may also include an extensive network of memory circuits that serve as lookup tables and intermediate packet buffers. Network interface controllers implemented in this way can provide superior customer configurability/customizability while also meeting power and form factor constraints. It will be recognized by one skilled in the art, that the present exemplary embodiments may be practiced without some or all of these specific details. In other instances, well-known operations have not been described in detail in order not to unnecessarily obscure the present embodiments.

Figure 1:
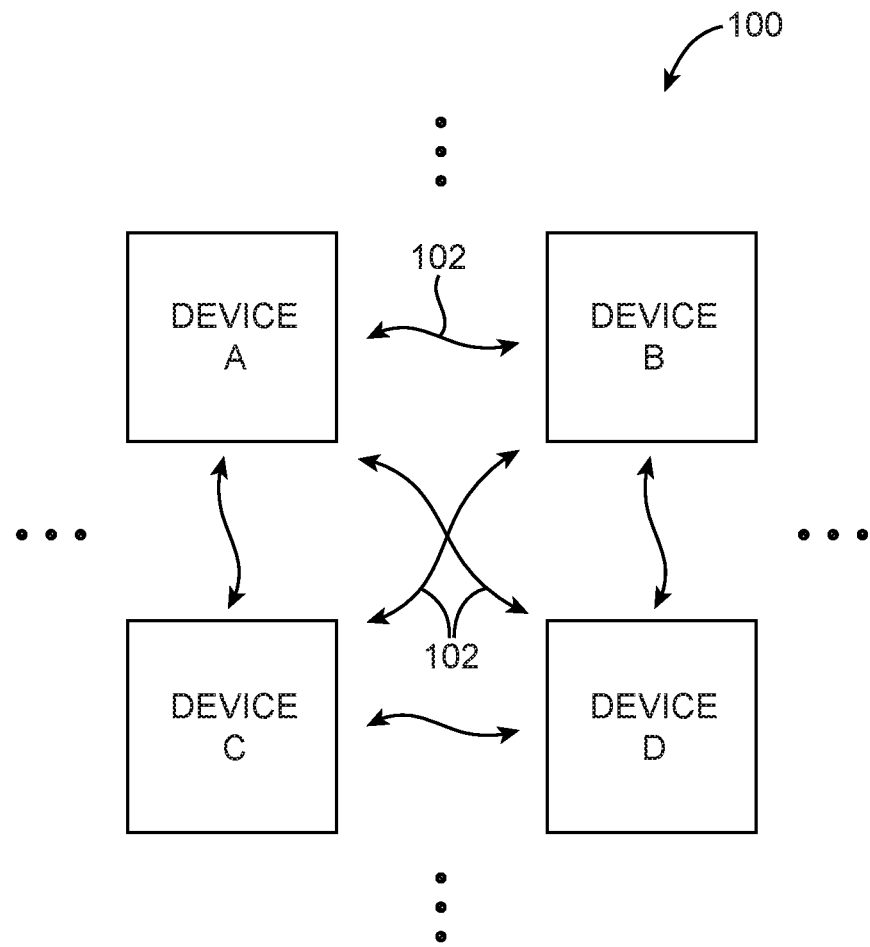
FIG. 1 is a diagram of an illustrative system of integrated circuit devices operable to communicate with one another in accordance with an embodiment.

FIG. 1 is a diagram of an illustrative system 100 of interconnected electronic devices. The system of interconnected electronic devices may have multiple electronic devices such as device A, device B, device C, device D, and interconnection resources 102. Interconnection resources 102 such as conductive lines and busses, optical interconnect infrastructure, or wired and wireless networks with optional intermediate switching circuitry may be used to send signals from one electronic device to another electronic device or to broadcast information from one electronic device to multiple other electronic devices. For example, a transmitter in device B may transmit data signals to a receiver in device C. Similarly, device C may use a transmitter to transmit data to a receiver in device B.

The electronic devices may be any suitable type of electronic device that communicates with other electronic devices. Examples of such electronic devices include integrated circuits having electronic components and circuits such as analog circuits, digital circuits, mixed-signal circuits, circuits formed within a single package, circuits housed within different packages, circuits that are interconnected on a printed-circuit board (PCB), etc.

To facilitate communications between an integrated circuit and a computing network, a network interface controller (sometimes referred to as a network interface card or "NIC") is provided. Typical smart-NIC processing of packets received from the network involves pre-parsing Ethernet packets, validating the packets, extracting quality of service (QoS) requirements from the packets, and decrypting the packets. The decrypted packets are stored in a buffer and the associated header information is passed to a packet processing engine. The packet processing engine transforms the packet to enable network address and port translation services, connection tracking, policing, and gathering of per-entity statistics.

Smart-NICs implemented using only a programmable integrated circuit such as a field-programmable gate array (FPGA) die provides the desired flexibility to enable different open-virtual switching and virtual router implementations as well as being configurable to optimize for the network service. Network interface cards are also used to facilitate secure communication channels between different compute and storage servers by accelerating or offloading cryptographic functions, remote direct memory access, flowing pacing, and compression services. As the packet processing rate increases, however, these basic packet processing functions tend to consume a lot of FPGA resources, which translate to higher logic element usage and higher power consumption.

In accordance with an embodiment, a network interface controller (NIC) is provided where the basic primitive functions are implemented on a base (bottom) die (e.g., an application-specific integrated circuit or "ASIC" die) while the configurable fabric and packet processing components are implement on a top (stacked) die (e.g., a programmable integrated circuit such as a field-programmable gate array or "FPGA"). The programmable fabric of the top die provides high bandwidth interconnect circuitry to efficiently access the primitive functions on the base die.

Figure 2:
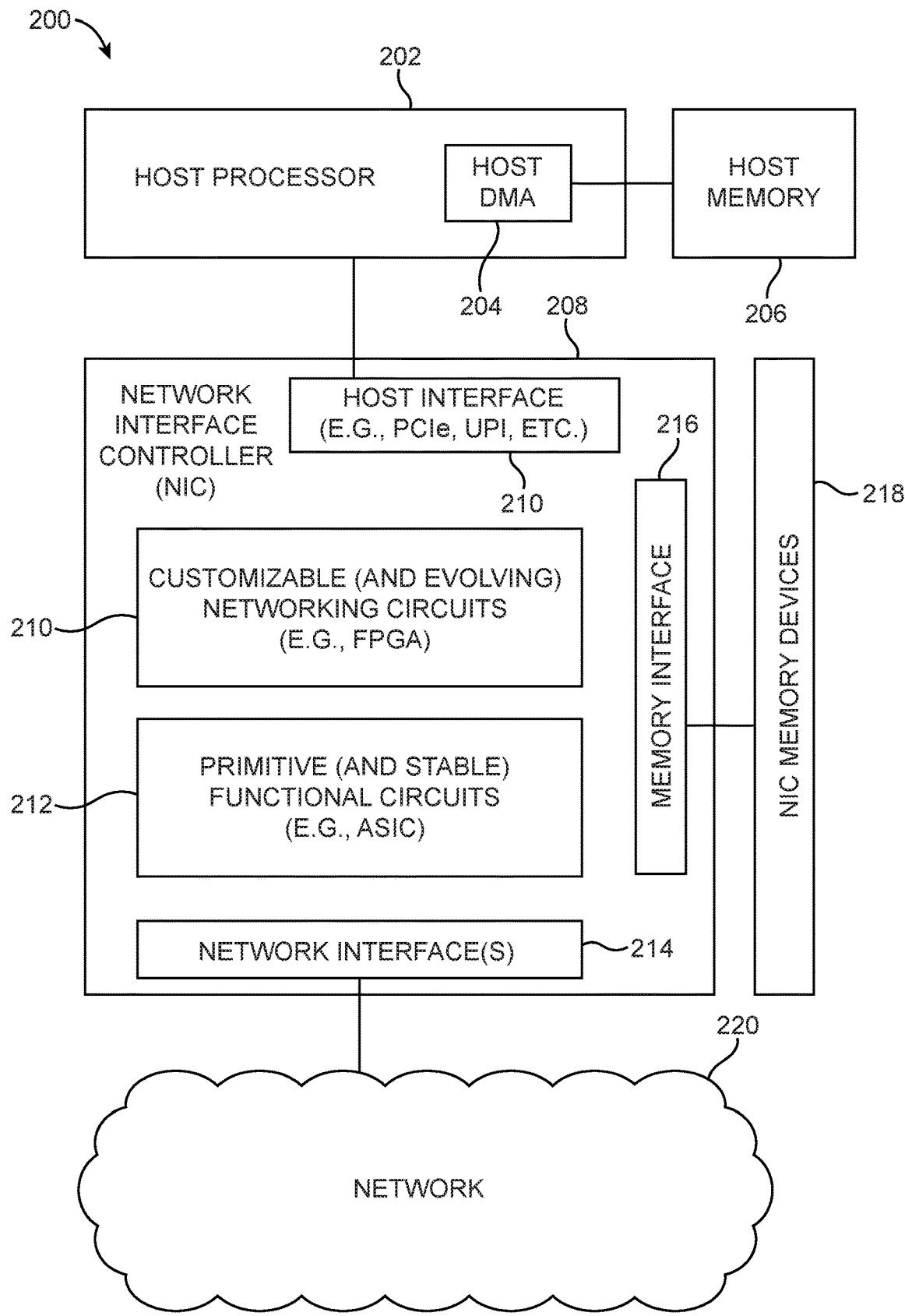
FIG. 2 is a diagram of an illustrative system with a network interface controller (NIC) that includes customizable networking blocks and primitive functional blocks in accordance with an embodiment.

FIG. 2 is a diagram of an illustrative system 200 with a network interface controller such as NIC 208. As shown in FIG. 2, network interface controller 208 may be interposed between a host processor such as host processor 202 and a computing network such as network 220. In general, system 200 may be part of a personal area network (PAN), a local area network (LAN), a metropolitan area network (MAN), a wide area network (WAN), a storage area network (SAN), an enterprise private network (EPN), a datacenter network, a virtual private network (VPN), a system area network, or other suitable types of data storage and processing networks. Host processor 202 may for example be a central processing unit (CPU), a microprocessor, a microcontroller, or a graphics processing unit (GPU). Host processor 202 (sometimes referred to as a host CPU or simply CPU) may include one or more processing cores for processing instructions of a computer program or software application.

Host processor 202 may include a host direct memory access (DMA) component such as host DMA engine 204 for direct access of an external host memory 206. Host memory 206 is sometimes referred to as a "main memory" device. Main memory refers to physical memory that can be directly accessed by host processor 202. Main memory 206 may be implemented using volatile memory components such as dynamic random-access memory (DRAM). Main memory (sometimes also referred to as "primary storage") is distinguished from external mass storage devices such as disk drives, optical drives, and tape drives. CPU 202 can only manipulate data that is stored in main memory 206. Thus, every program that is executed or every file that is accessed must be copied from an external mass storage device into main memory 206. The amount of storage in memory main 206 may therefore determine how many programs can be executed at any point in time and the amount of data that can be made readily available to the program.

In general, the software running on host CPU 202 may be implemented using software code stored on non-transitory computer readable storage media (e.g., tangible computer readable storage media). The software code may sometimes be referred to as software, data, program instructions, instructions, script, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of host processor 202.

Still referring to FIG. 2, network interface controller 208 may include a host interface such as host interface 208 operable to communicate with host processor 202, a memory interface such as memory interface 216 operable to communicate with off-chip NIC-attached memory devices 218, a network interface such as network interface(s) 214 operable to communicate with network 220, customizable networking circuits 210, and primitive functional circuits 212.

Host interface 210 may be a non-coherent computer bus interface such as the PCIe (Peripheral Component Interconnect Express) interface or a coherent computer bus interface such as UltraPath Interconnect (UPI), QuickPath Interconnect (QPI), Compute Express Link (CXL), Cache Coherent Interconnect for Accelerators (CCIX), Gen-Z, Open Coherent Accelerator Processor Interface (OpenCAPI), Intel Accelerator Link (IAL), NVidia's NVLink, or other computer bus interfaces.

Memory interface 216 may be implemented as double data rate (DDR) interfaces such as DDR type-3 (DDR3), low power DDR3 (LPDDR3), DDR type-4 (DDR4), low power DDR4 (LPDDR4), DDR type-5 (DDR5), graphics DDRx, quad data rate (QDR), Open NAND Flash Interface (ONFI), or other suitable interfaces for communicating with external memory. Memory interface 216 may include memory controllers for supporting a wide variety of external memory protocols. Network interface(s) 214 may implemented as a wired IEEE 802.3 Ethernet interface, a Fast Ethernet interface, a Gigabit Ethernet interface, a Token Ring interface (just to name a few), or a wireless connection (e.g., a IEEE 802.11 Wi-Fi or Bluetooth® connection).

The customizable networking circuits 210 may include circuit blocks that might evolve from one product generation to another and/or that might be different depending on a customer's needs. In contrast, the "primitive" function circuits 212 represent basic/generic networking blocks that remain stable between product generations and/or remain fixed across different customer applications. As such, the customizable (and evolving) networking circuit blocks 210 may be implemented using "soft" or reconfigurable resources on a programmable integrated circuit die such as a field-programmable gate array (FPGA), whereas the primitive (and stable) functional circuit blocks 212 may be implemented as "hardened" or non-reconfigurable functional blocks on an application-specific integrated circuit (ASIC) die.

As demands on integrated circuit technology continue to outstrip even the gains afforded by ever decreasing device dimensions, an increasing number of applications demand a packaged solution with more integration than is possible in one silicon die. In an effort to meet this need, more than one IC die may be placed within an integrated circuit package (i.e., a multichip package). As different types of devices cater to different types of applications, more IC dies may be required in some systems to meet the requirements of high performance applications. Accordingly, to obtain better performance and higher density, a multichip package may include multiple dies arranged laterally along the same plane or may include multiple dies stacked on top of one another.

Figure 3:
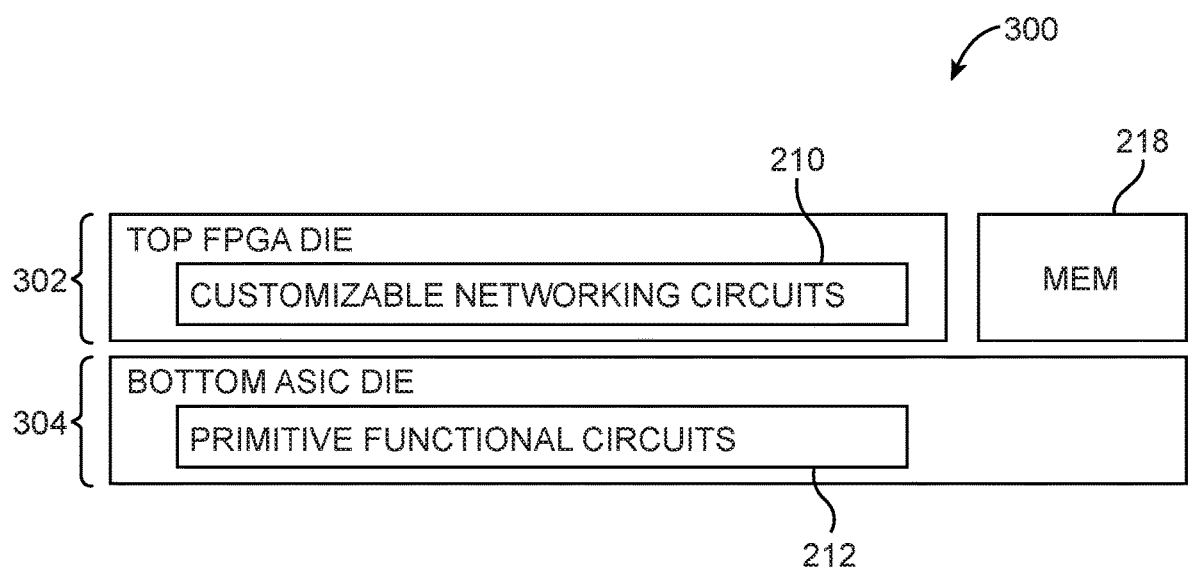
FIG. 3 is a cross-sectional side view of an illustrative network interface controller (NIC) implemented in a stacked die configuration in accordance with an embodiment.

FIG. 3 is a cross-sectional side view of an illustrative network interface controller (NIC) such as NIC 208 of FIG. 2 implemented as a stacked multichip package such as multichip package 300. As shown in FIG. 3, multichip package 300 may include a top FPGA die 302 and associated external memory 218 stacked directly on top of a bottom ASIC die 304 (sometimes referred to as the "base die"). This configuration in which top die 302 is stacked vertically over base die 304 is sometimes referred to as a 3-dimensional or "3D" die stack configuration.

The customizable (and evolving) networking circuit blocks 210 may generally be implemented on the top die 302, whereas the primitive (and stable/fixed) functional circuit blocks 212 are implemented on the bottom die 304. This close coupling between top die 302 and bottom die 304 facilitates efficient inter-block control and data communication between the two dies. The primitive hardened function blocks on the base die 304 may be selectively accessed using flexible high-bandwidth interconnect fabric on the top die 302. This arrangement in which the high power and high logic element consuming functions are allocated to the base die while the flexible interconnect circuitry are delegated to the top FPGA die creates a customizable packet processing pipeline while meeting desirable power and form factor targets.

The arrangement of FIG. 3 in which the programmable die 302 is stacked on top of the ASIC die 304 is merely illustrative. If desired, the ASIC die 304 may alternatively be stacked on top of the programmable die 302.

Figure 4:
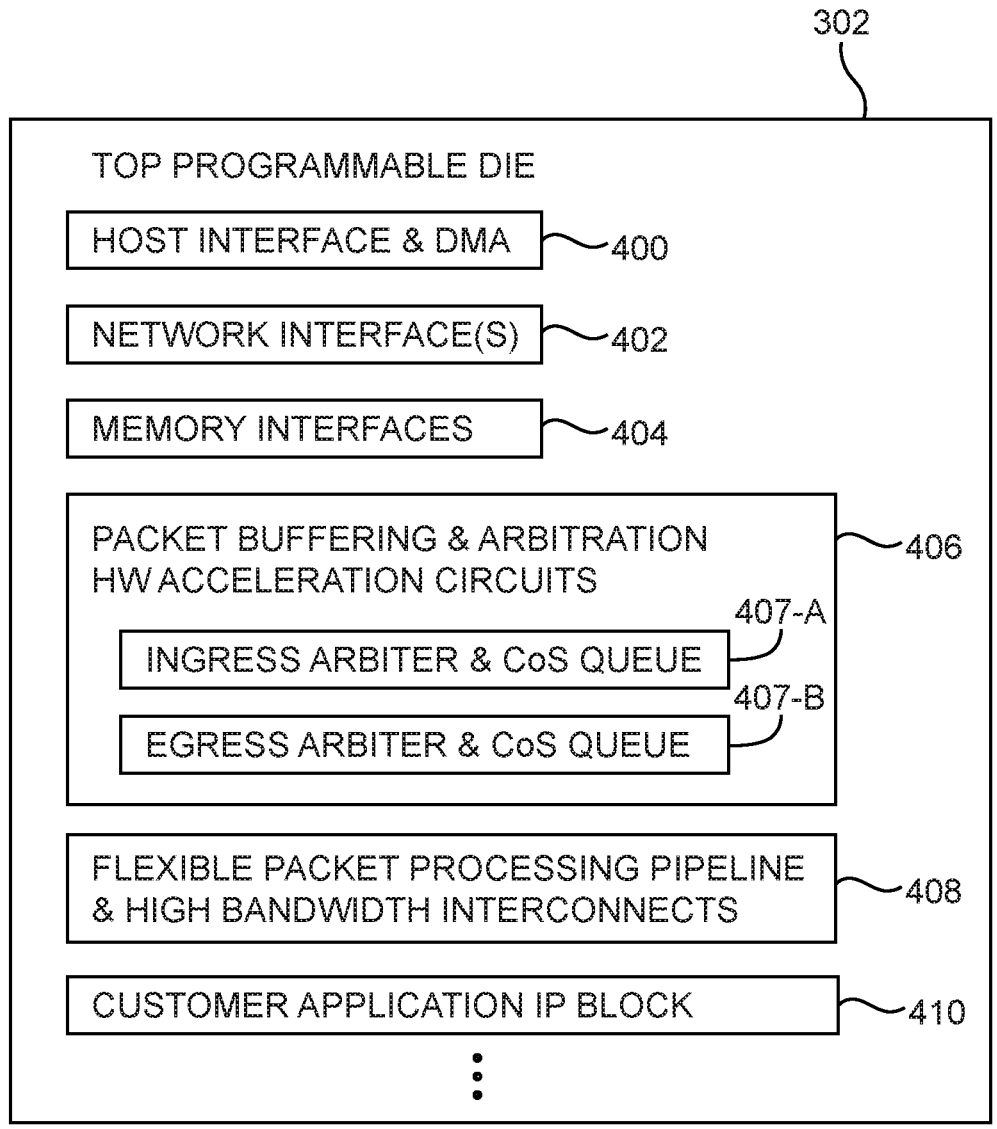
FIG. 4 is a diagram of an illustrative programmable integrated circuit die that includes customizable networking blocks in accordance with an embodiment.

FIG. 4 is a diagram showing illustrative circuit blocks that may be included within the top programmable die 302. As shown in FIG. 4, top programmable die 302 may include a host interface and associated direct memory access (DMA) engine (labeled collectively as circuits 400 and optionally corresponding to at least host interface 210 of FIG. 2), network interface(s) 402 (optionally corresponding to network interface 214 of FIG. 2), memory interfaces 404 (optionally corresponding to memory interface 216 of FIG. 2), packet buffering and arbitration hardware acceleration circuits 406, flexible packet processing pipeline and high bandwidth interconnects 408, customer application intellectual property (IP) blocks 410, and other suitable configurable network processing and storage circuitry.

Packet buffering and arbitration hardware (HW) acceleration (ACC) circuits 406 may include ingress arbiter and class of service (CoS) queue(s), collectively labeled as circuits 407-A. Circuits 406 may also include egress arbiter and CoS queue(s), collectively labeled as circuits 407-B. Ingress arbiter and CoS queue circuits 407-A may be primarily response for absorbing short term high packet incoming rate and preventing important data packets from dropping when packets cannot be processed at a lower rate due to resource constraints. Circuits 407-A may send flow rate control messages to the remote sender to ensure that no packets of such class of packets are getting dropped. Egress arbiter and CoS queue circuits 407-B may be primarily responsible for handling receipt of remote flow control messages and stalling transmission of packets in response to receive such flow control messages. Circuits 407-B may also be responsible for prioritizing the scheduling of important packets onto the network relative to traffic with lesser priority.

The flexible (reconfigurable) packet processing pipeline and high bandwidth interconnects 408 may serve as a programmable yet efficient conduit between the different functional blocks on the base die. If desired, the packet processing pipeline of the top die may optionally be configured to support packet parsing, packet validation, extracting flow keys for exact matching operations, longest prefix matching (LPM) operations, and range and wildcard match based lookup to extract actions on how to modify/remove/add bytes of a packet, connection tracking, policing and statistics gathering operations, flexible congestion control for remote DMA, and other suitable operations that might be desirable to be implemented using programmable logic resources. Customer application IP block 410 may be configured to support whatever application that is desired by the user of the overall NIC component.

Figure 6:
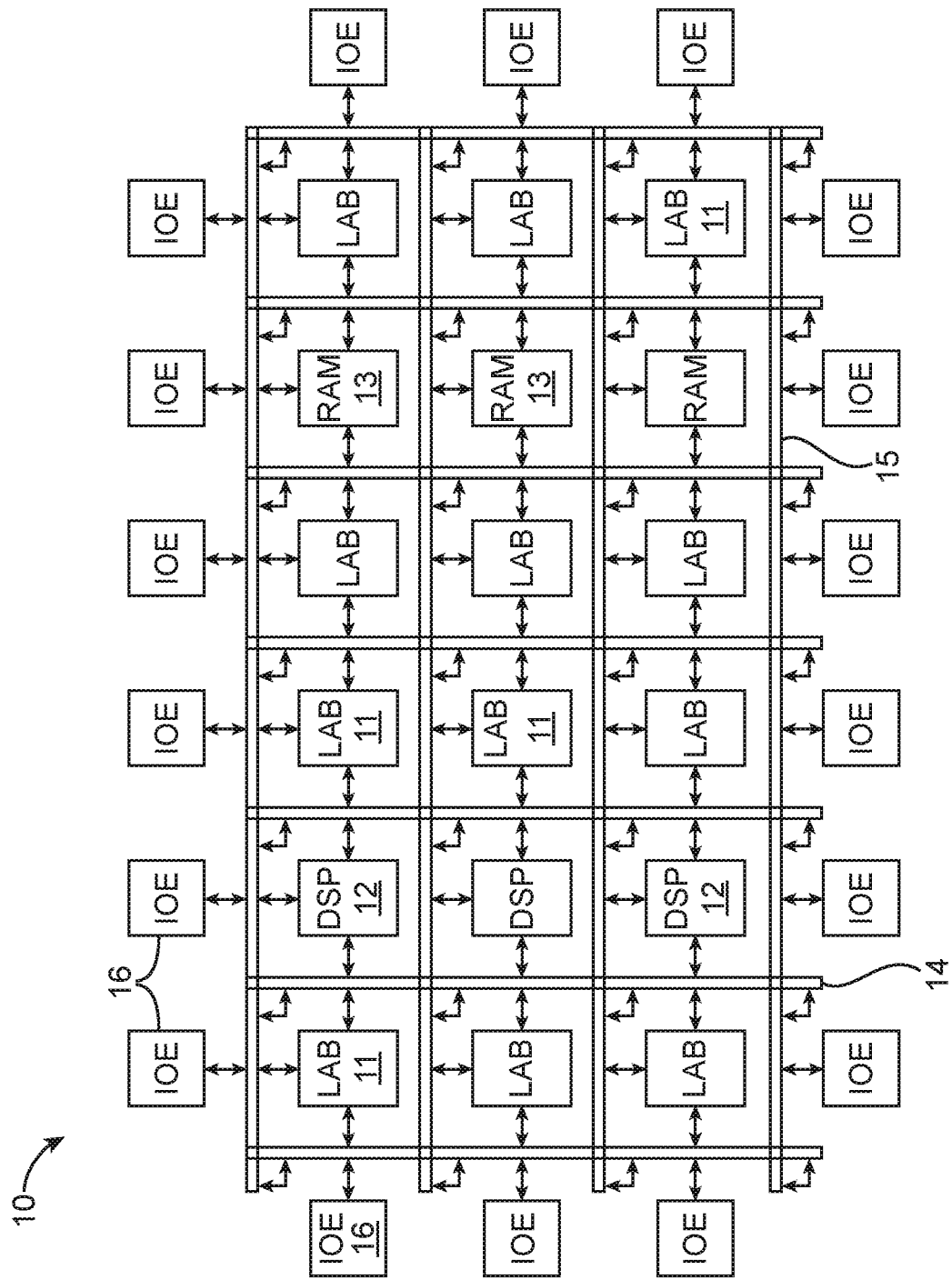
FIG. 6 is a diagram of an illustrative programmable integrated circuit in accordance with an embodiment.

The top die 302 may be implemented as a programmable integrated circuit such as a programmable integrated circuit 10 of the type shown in FIG. 6. Programmable integrated circuit 10 may be a programmable logic device (PLD). Examples of programmable logic devices include programmable arrays logic (PALs), programmable logic arrays (PLAs), field programmable logic arrays (FPGAs), electrically erasable programmable logic devices (EPLDs), electrically erasable programmable logic devices (EEPLDs), logic cell arrays (LCAs), complex programmable logic devices (CPLDs), and field programmable gate arrays (FPGAs), just to name a few. As shown in FIG. 6, device 10 may include a two-dimensional array of functional blocks, including logic array blocks (LABs) 11 and other functional blocks, such as random access memory (RAM) blocks 13 and specialized processing blocks such as digital signal processing (DSP) blocks 12 that are partly or fully hardwired to perform one or more specific tasks such as mathematical/arithmetic operations.

Functional blocks such as LABs 11 may include smaller programmable regions (e.g., logic elements, configurable logic blocks, or adaptive logic modules) that receive input signals and perform custom functions on the input signals to produce output signals. Device 10 may further include programmable routing fabric that is used to interconnect LABs 11 with RAM blocks 13 and DSP blocks 12. The combination of the programmable logic and routing fabric is sometimes referred to as "soft" logic, whereas the DSP blocks are sometimes referred to as "hard" logic. The type of hard logic on device 10 is not limited to DSP blocks and may include other types of hard logic. Adders/subtractors, multipliers, dot product computation circuits, and other arithmetic circuits which may or may not be formed as part of a DSP block 12 may sometimes be referred to collectively as "arithmetic logic."

Programmable logic device 10 may contain programmable memory elements for configuring the soft logic. Memory elements may be loaded with configuration data (also called programming data) using input/output elements (IOEs) 16. Once loaded, the memory elements provide corresponding static control signals that control the operation of one or more LABs 11, programmable routing fabric, and optionally DSPs 12 or RAMs 13. In a typical scenario, the outputs of the loaded memory elements are applied to the gates of metal-oxide-semiconductor transistors (e.g., pass transistors) to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc. The logic gates and multiplexers that are part of the soft logic, configurable state machines, or any general logic component not having a single dedicated purpose on device 10 may be referred to collectively as "random logic."

The memory elements may use any suitable volatile and/or non-volatile memory structures such as random-access-memory (RAM) cells, fuses, antifuses, programmable read-only-memory memory cells, mask-programmed and laser-programmed structures, mechanical memory devices (e.g., including localized mechanical resonators), mechanically operated RAM (MORAM), programmable metallization cells (PMCs), conductive-bridging RAM (CBRAM), resistive memory elements, combinations of these structures, etc. Because the memory elements are loaded with configuration data during programming, the memory elements are sometimes referred to as configuration memory, configuration RAM (CRAM), configuration memory elements, or programmable memory elements.

In addition, programmable logic device 10 may use input/output elements (IOEs) 16 to drive signals off of device 10 and to receive signals from other devices. Input/output elements 16 may include parallel input/output circuitry, serial data transceiver circuitry, differential receiver and transmitter circuitry, or other circuitry used to connect one integrated circuit to another integrated circuit. As shown, input/output elements 16 may be located around the periphery of the chip. If desired, the programmable logic device may have input/output elements 16 arranged in different ways.

The routing fabric (sometimes referred to as programmable interconnect circuitry) on PLD 10 may be provided in the form of vertical routing channels 14 (i.e., interconnects formed along a vertical axis of PLD 10) and horizontal routing channels 15 (i.e., interconnects formed along a horizontal axis of PLD 10), each routing channel including at least one track to route at least one wire. If desired, the functional blocks of device 10 may be arranged in more levels or layers in which multiple functional blocks are interconnected to form still larger blocks. Other device arrangements may use functional blocks that are not arranged in rows and columns.

Figure 5:
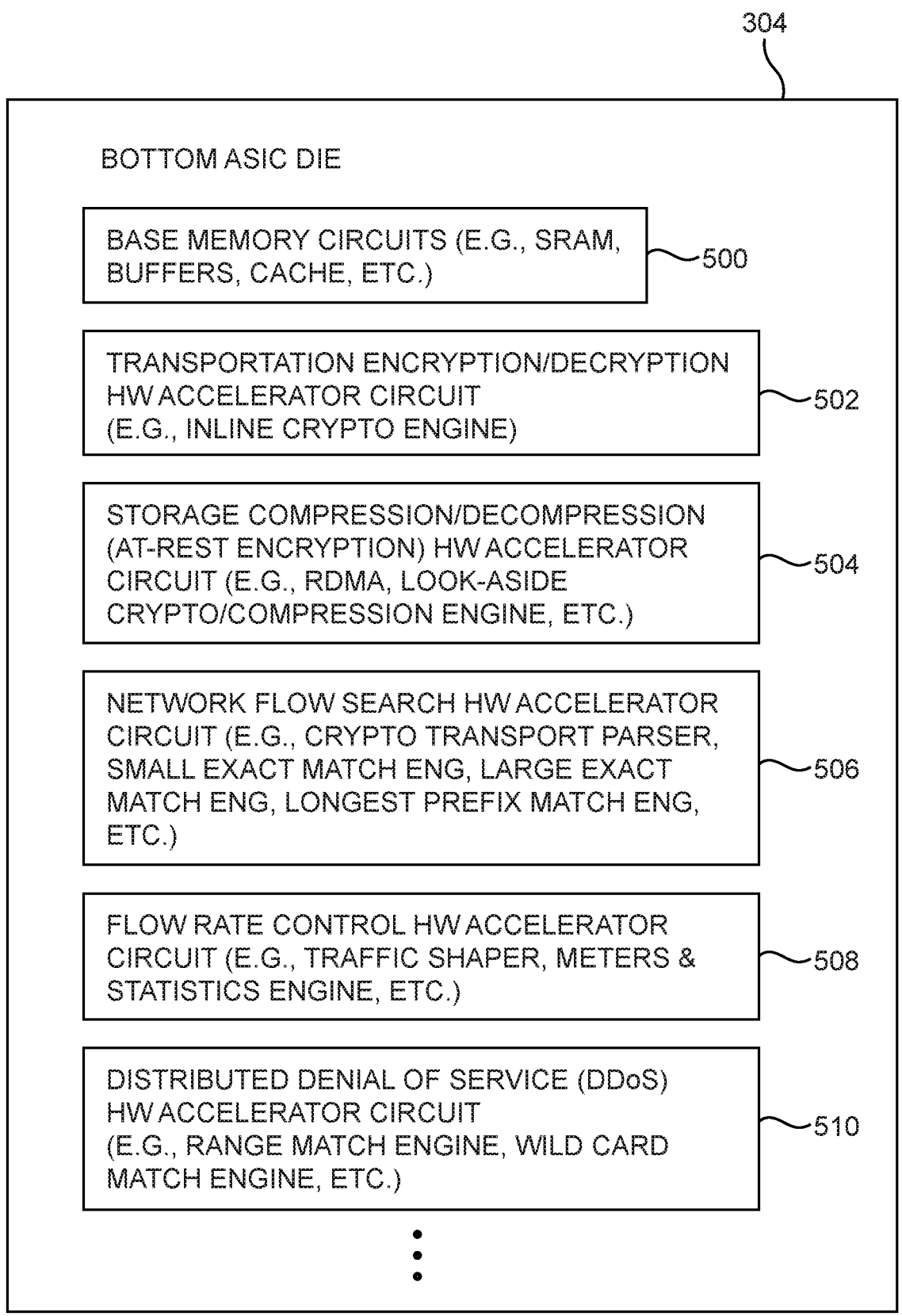
FIG. 5 is a diagram of an illustrative application-specific integrated circuit (ASIC) die that includes primitive functional blocks in accordance with an embodiment.

FIG. 5 is a diagram showing illustrative circuit blocks that may be included within the base ASIC die 304. As shown in FIG. 5, bottom die 304 may include primitive functional blocks including but not limited to: base memory circuits 500, transportation encryption/decryption hardware accelerator circuit 502, storage compression/decompression (at-rest encryption) hardware accelerator circuit 504, network flow search hardware accelerator circuit 506, flow rate control hardware accelerator circuit 508, distributed denial of service (DDoS) hardware accelerator circuit 510, and other suitable high power or stable/fixed functional blocks that are better suited for an ASIC implementation. If desired, the bottom die 304 may also be provided with one or more configurable logic sector blocks to offer more flexibility.

Base memory circuits 500 may be volatile memory circuit blocks such as static random-access memory (SRAM) blocks, buffers, cache, and/or other memory circuit suitable for storing packet information.

Transportation encryption/decryption (security) hardware accelerator 502 may help secure in-transmit networking application traffic between applications/containers across different hosts connected through an Ethernet network with protocols like Internet Protocol Security (IPsec), Datagram Transport Layer Security (DTLS), Advanced Encryption Standard (AES), Secure Hash Algorithms (SHA), and other SHA-like algorithms. As an example, transportation encryption/decryption HW accelerator 502 may include an inline cryptographic engine (ICE) that accelerates security protocol processing by implementing IPsec or security functions for DTLS. For instance, the inline crypto engine may implement 256-bit AES-GCM (Galois/Counter Mode), AES-CBC (Cipher Blocker Chaining), or SM4-like encryption algorithms to create a secure infrastructure. The inline crypto engine may also implement message authentication and anti-reply checking to prevent "man-in-the-middle" attacks.

Storage compression/decompression hardware accelerator 504 may compress and/or decompress network traffic, which helps reduce the size of stored data and therefore reduces the total cost of ownership for data center operators. Large data files can optionally be secured using "at-reset" encryption. As an example, storage compression/decompression HW accelerator 504 may include a remote DMA (RDMA) engine that enables reduction in CPU cycles in disaggregated storage applications. As another example, HW accelerator 504 may also include a look-aside cryptographic/compression engine (LCE) that enables compression and other cryptographic functions.

Network flow search hardware accelerator 506 may be used to search packet fields. A network flow is typically characterized by N different unique packet fields. Oftentimes, N-type packet fields can be hundreds or even thousands of bits. Network flow search HW accelerator 506 may perform such search using complex hashing algorithms. As an example, network flow search HW accelerator 506 may include a cryptographic transport parser (CXP) that identifies a security association corresponding to a particular application packet. The CXP may extract different packet fields that are unique for an application and then perform a flow search operation to identify the security key(s) associated with the application. As another example, accelerator 506 may include a small exact match (SEM) engine or a large exact match (LEM) engine that is used to search a specific flow to extract flow keys from incoming packets. As yet another example, accelerator 506 may include a longest prefix match (LPM) engine that performs a longest prefix match for Internet Protocol version 4 (IPv4) and Internet Protocol version 6 (IPv6) addresses (as examples) to identify the final destination of a packet.

Flow rate control hardware accelerator 508 may be used to ensure smooth delivery of service for all tenants on the network by controlling the traffic flow of an "aggressive" tenant. In other words, some networking application flows corresponding to one tenant or a group of tenants over-utilizing the network may be rate-controlled or throttled to ensure service level agreement (SLA) guarantees are met for all tenants hosted on the same host processor. As an example, accelerator 508 may include a traffic shaper engine that is used to regular the amount of traffic on a per application basis to guarantee a smoother delivery as well as reducing packet drops in the network. As another example, accelerator 508 may include a meters/policing and statistics engine that regulates the application traffic to enable SLA guarantees to other containers and applications while enabling gathering of accounting, billing, and other desirable networking analytics.

Distributed denial of service (DDoS) hardware accelerator 510 may be used to block service attacks originating from unauthorized network end points. As an example, DDoS HW accelerator 510 may include a range match (RM) engine and/or a wild card match (WCM) engine that block inappropriate application packets from suspicious applications to prevent potential DDoS attacks.

The illustrative primitive function blocks shown in FIG. 5 are merely illustrative and are not intended to limit the scope of the present embodiments. If desired, the base ASIC die 304 may also include accelerator circuits for performing connection tracking, key extraction, and other potentially high power or high logic resource consuming operation that might be more suitably offloaded to the base die.

Figure 7:
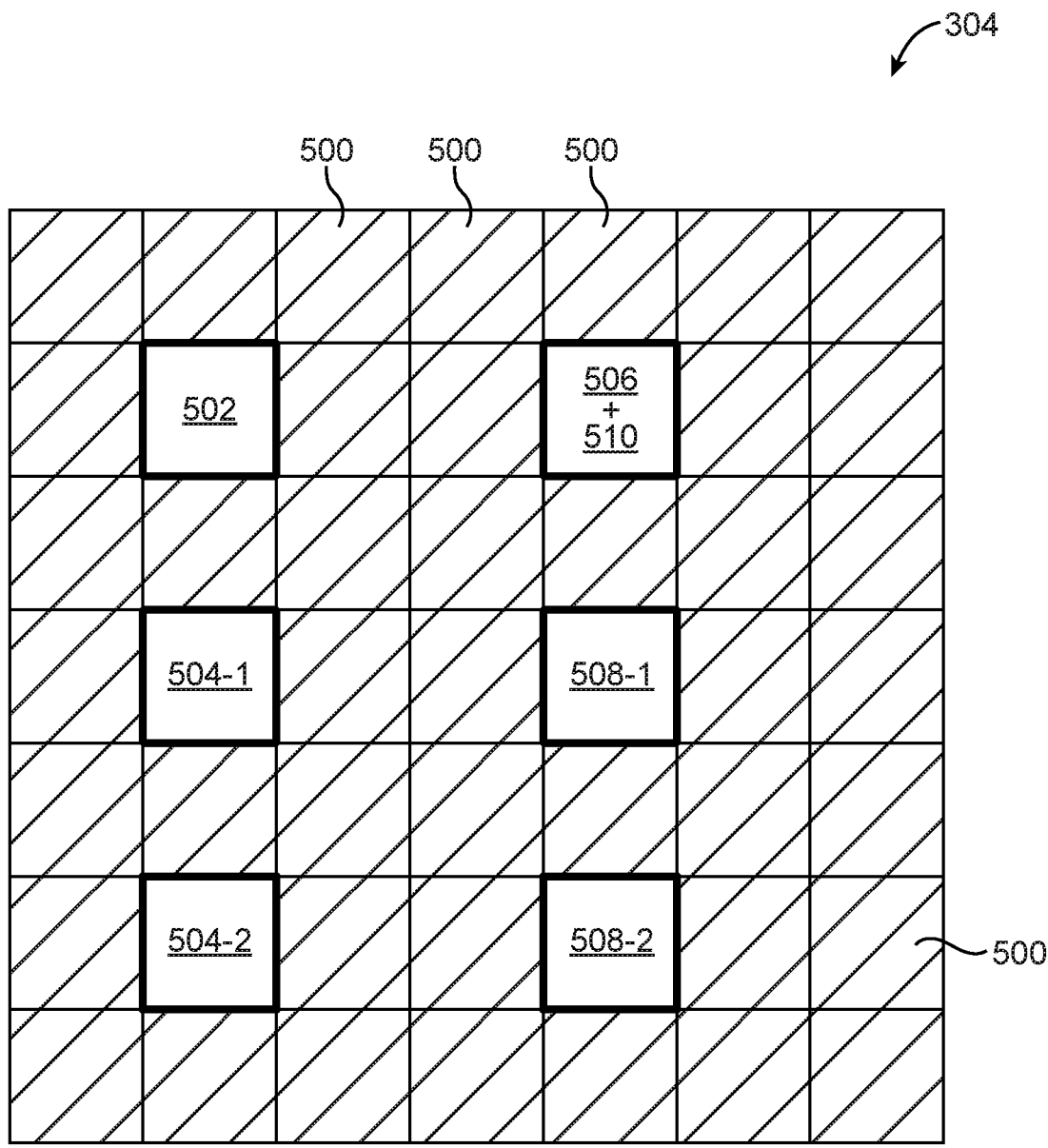
FIG. 7 is a top plan (layout) view of the ASIC die shown in FIG. 5 in accordance with an embodiment.

FIG. 7 is a top plan (layout) view of bottom ASIC die 304. As shown in FIG. 7, ASIC die 304 may have a variety of primitive network function blocks distributed throughout an array of memory circuits 500 (see shaded blocks). For example, a transportation encryption/decryption hardware acceleration circuit block 502 (e.g., an inline cryptography engine) may be formed in a first location on die 304 surrounded by neighboring memory blocks 500, a first storage compression/decompression hardware accelerator circuit block 504-1 (e.g., an RDMA engine) may be formed in a second location on die 304 surrounded by neighboring memory blocks 500, a second storage compression/decompression hardware accelerator circuit block 504-2 (e.g., a look-aside cryptography/compression engine) may be formed in a third location on die 304 surrounded by neighboring memory blocks 500, a network flow search hardware accelerator circuit block 506 (e.g., a crypto transport parser, an SEM/LEM engine, or LPM engine) and DDoS hardware accelerator circuit block 510 may both be formed in a fourth location on die 304 surrounded by neighboring memory blocks 500, a first flow rate control hardware accelerator circuit block 508-1 (e.g., a traffic shaper engine) may be formed in a fifth location on die 304 surrounded by neighboring memory blocks 500, and a second flow rate control hardware accelerator circuit block 508-2 (e.g., a RM/WCM engine) may be formed in a sixth location on die 304 surrounded by neighboring memory blocks 500.

The example of FIG. 7 in which six hardened primitive network function blocks are formed in a sea of base memory blocks 500 is merely illustrative and is not intended to limit the scope of the present embodiments. If desired, each non-memory function block need not be completely surrounded by memory blocks 500 (e.g., a given primitive block might only be surrounded by memory blocks 500 on three sides, on two sides, or on only one side), non-memory function blocks can be formed at any desired interval on die 304, any number of accelerator blocks can be grouped at any particular location, etc. If desired, the base die may also be implemented as multiple chiplets or smaller integrated circuit dies stacked below the top FPGA die. Each chiplet may include one or more of the primitive functional blocks and/or base memory circuits.

Figure 8A:
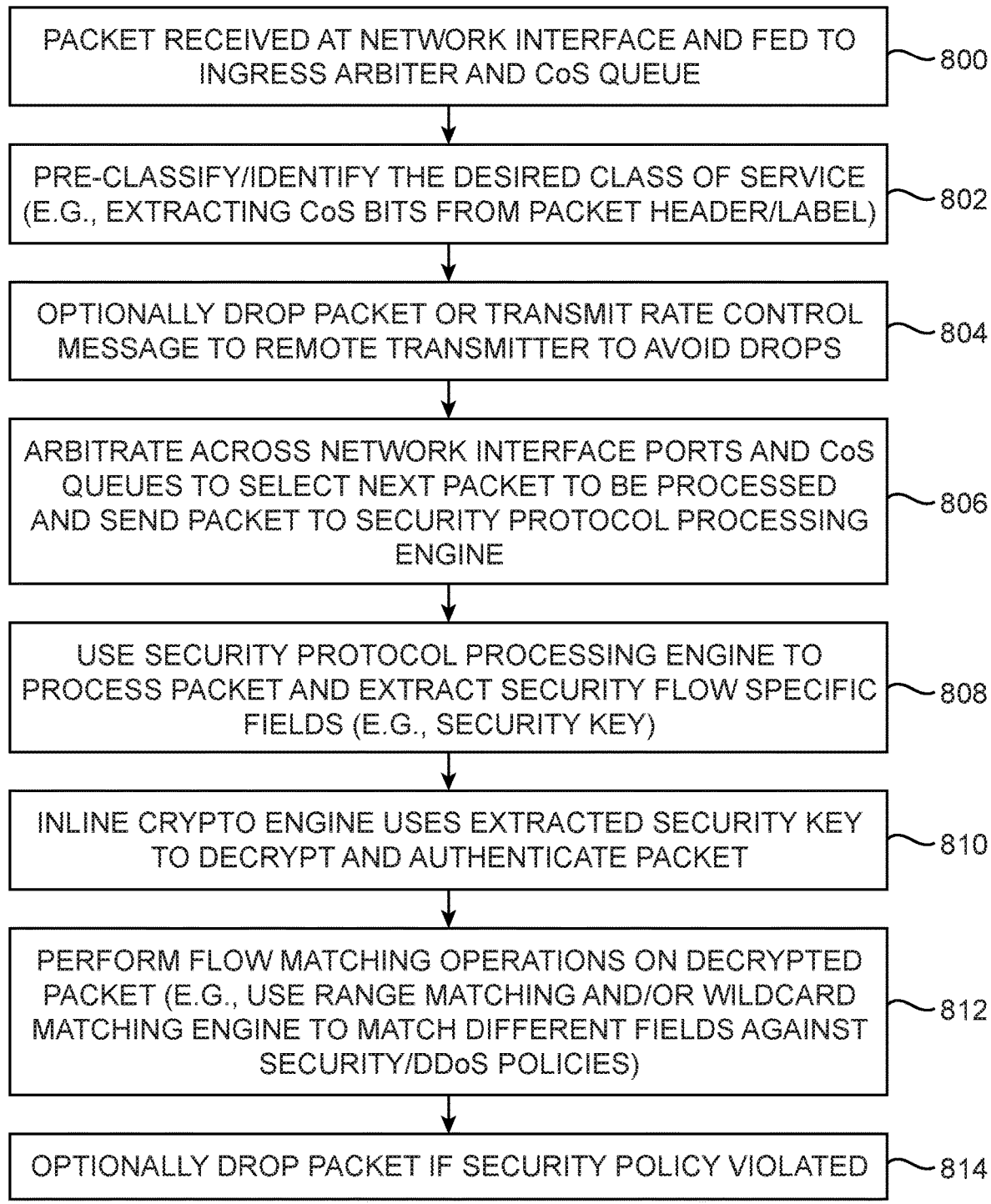
FIGS. 8A and 8B show illustrative steps for operating a network interface controller of the type shown in connection with FIGS. 2-7 in accordance with an embodiment.
Figure 8B:
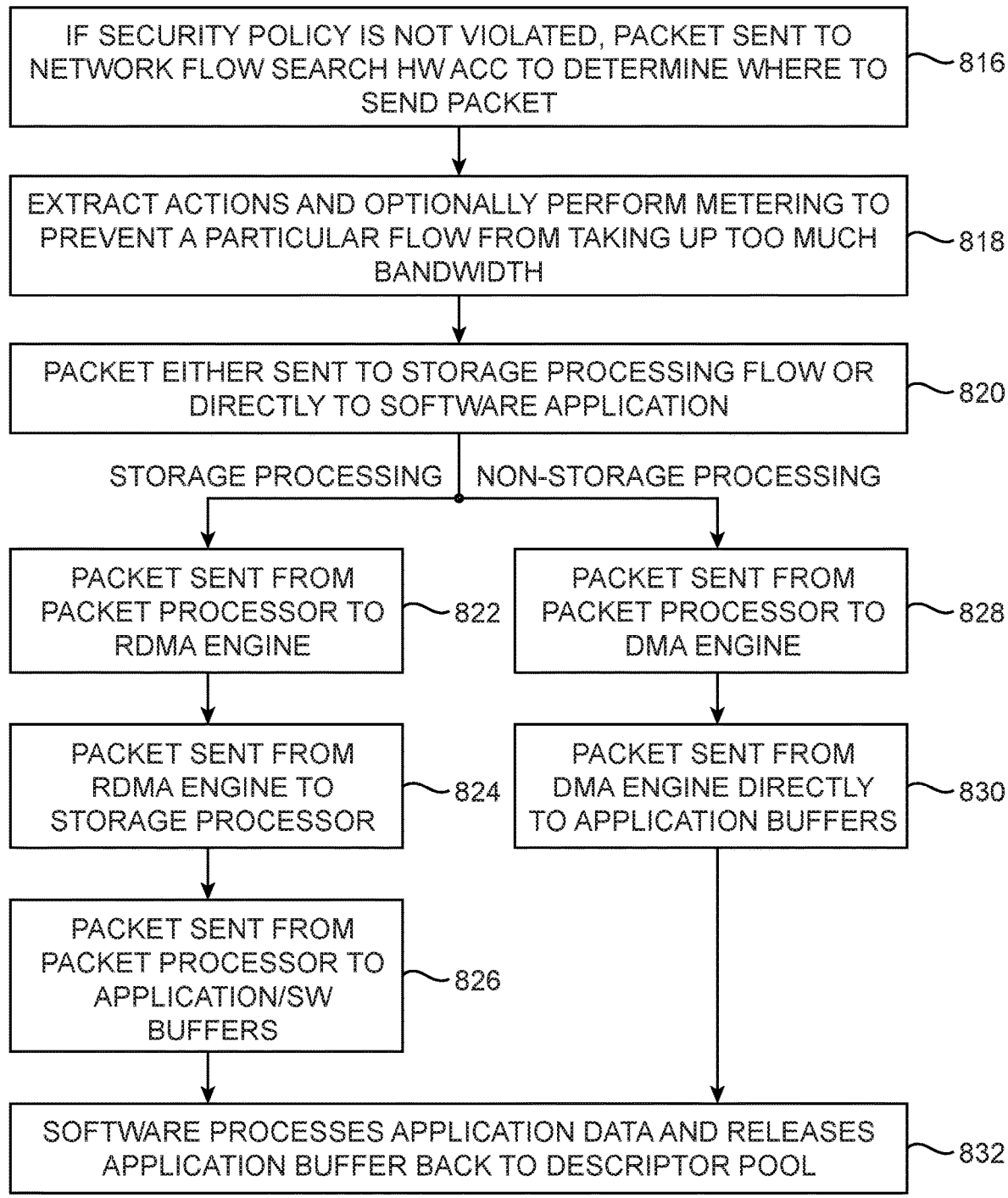

FIGS. 8A and 8B show illustrative steps for operating a network interface controller of the type shown in connection with FIGS. 2-7 in accordance with an embodiment. At step 800, a packet may be received at network interface 214 from the network, which can then be fed to ingress arbiter and CoS queue circuits 407-A in the top die. Circuits 407-A may be primarily response for absorbing short term high packet incoming rate and preventing important data packets from dropping when packets cannot be processed at a lower rate due to resource constraints. Circuits 407-A may send flow rate control messages to the remote sender to ensure that no packets of such class of packets are getting dropped.

At step 802, the packet may be pre-classified to identify the desired class of service (e.g., by extracting CoS bits from the packet header or label field). At step 804, the packet may optionally be dropped or a transmit rate control message may be send to a remote transmitter to avoid drops.

At step 806, the NIC may arbitrate across network interface ports and CoS queues to select a next packet to be processed. The selected packet may then be send to a security protocol processing engine, which may include a cryptographic transport parser (CXP) and an inline cryptographic engine (ICE) as an example. In general, the security protocol processing engine may include circuits from transportation encryption/decryption HW accelerator 502, network flow search HW accelerator 506, storage compression/decompression HW accelerator 504, and/or DDoS HW accelerator 510. At step 808, the security protocol processing engine may process the packet to extract security flow specific fields (e.g., to extract one or more security keys from the packet).

At step 810, the inline cryptographic engine (ICE) may use the extracted security key to decrypt and authenticate the packet. The ICE may help accelerate security protocol processing by implementing IPsec or security functions for DTLS. For example, the inline crypto engine may implement 256-bit AES-GCM (Galois/Counter Mode), AES-CBC (Cipher Blocker Chaining), or SM4-like encryption algorithms to create a secure infrastructure. The inline crypto engine may also implement message authentication and anti-reply checking to prevent "man-in-the-middle" attacks.

At step 812, flow matching operations may be performed on the decrypted packet. As examples, different fields are matched against security or denial-of-service policies using the range matching (RM) engine and/or the wild card matching (WCM) engine. The RM/WCM engines may block inappropriate application packets from suspicious applications to prevent potential DDoS attacks. At step 814, the packet is optionally dropped from further processing if a security policy is violated.

Additional steps are shown in FIG. 8B. At step 816, if a security policy is not violated, the packet is sent to network flow search hardware accelerator 506 to determine where to send the packet. For example, the extracted flow keys may be used to perform exact or longest prefix matches to extract actions on how to process the packet (e.g., matching operations may be performed using the small exact match engine, the large exact match engine, and/or the longest prefix match engine).

At step 818, actions may be extracted from the flow matching operations and metering may optionally be performed to prevent a particular flow from taking up an excessive amount of bandwidth. For instance, certain packets that are taking up more than a predetermined chunk of bits on a network port may selectively be dropped. The metering may be managed using flow rate control hardware accelerator 508 (e.g., a traffic shaper engine or a meters/policing and statistics engine), which is used to ensure smooth delivery of service for all tenants on the network by controlling the traffic flow of an aggressive tenant. In other words, some networking application flows corresponding to one tenant or a group of tenants over-utilizing the network may be rate-controlled or throttled to ensure service level agreement (SLA) guarantees are met for all tenants hosted on the same host processor.

At step 820, the packet may be classified using the extracted actions, and the packet may either be sent to a storage processing flow/thread (proceeding to step 822) or to a non-storage processing flow/thread (proceeding to step 828).

When forking to the storage processing thread, the packet may be sent from the packet processor to an RDMA engine assuming an RDMA enabled flow (step 822). The packet processor may include circuits in only the top die (e.g., the flexible pipeline), in only the bottom die (e.g., the SEM/LEM engine, LPM engine, meters and statistics engine, etc.), or in both the top and bottom dies. At step 824, the packet may be sent from the RDMA engine to a storage processor. The storage processor may include circuits in only the top die, in only the bottom die, or in both the top and bottom dies. At step 826, the packet may be sent from the storage processor to application/software (SW) buffers (e.g., SW buffers within the customer IP blocks in the top die or application buffers in the host processor).

When forking to the non-storage processing thread, the packet may be sent from the packet processor to the DMA engine (e.g., a DMA engine on the top die or a DMA engine in the host processor). At step 830, the packet may be sent from the DMA engine directly to application buffers (e.g., application buffers within the customer IP blocks in the top die or software buffers in the host processor). For instance, the DMA engine may fetch descriptors to move the packet into the SW/application buffers and may send an interrupt notification to the application.

Follow either step 826 or 830, processing may proceed to step 832. At step 832, the application software may process the application data and may then release the application buffer back to the descriptor pool. Operated in this way, future packets may use the released application buffer pointed by such descriptor.

Although the methods of operations are described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

EXAMPLES

The following examples pertain to further embodiments.

Example 1 is a network interface controller, comprising: a first integrated circuit die that includes customizable networking circuits; and a second integrated circuit die that includes primitive network function circuits, wherein the first integrated circuit die is stacked vertically with respect to the second integrated circuit die.

Example 2 is the network interface controller of example 1, wherein the first integrated circuit die optionally comprises a programmable integrated circuit die.

Example 3 is the network interface controller of example 2, wherein the second integrated circuit die optionally comprises an application-specific integrated circuit (ASIC) die.

Example 4 is the network interface controller of any one of examples 1-3, wherein the first integrated circuit die is optionally stacked directly on top of the second integrated circuit die.

Example 5 is the network interface controller of any one of examples 1-3, wherein the second integrated circuit die is optionally stacked directly on top of the first integrated circuit die.

Example 6 is the network interface controller of any one of examples 1-5, wherein the first integrated circuit die optionally comprises: a host interface operable to communicate with an external host processor; a network interface operable to communicate with a network; and a memory interface operable to communicate with an external memory device.

Example 7 is the network interface controller of any one of examples 1-6, wherein the customizable networking circuits in the first integrated circuit die optionally comprises: packet buffering and arbitration hardware acceleration circuits.

Example 8 is the network interface controller of any one of examples 1-7, wherein the customizable networking circuits in the first integrated circuit die optionally comprises: flexible packet processing pipeline and interconnect circuitry.

Example 9 is the network interface controller of any one of examples 1-8, wherein the customizable networking circuits in the first integrated circuit die optionally comprises: a customer application intellectual property (IP) block.

Example 10 is the network interface controller of any one of examples 1-9, wherein the primitive network function circuits in the second integrated circuit die optionally comprises memory circuits.

Example 11 is the network interface controller of example 10, wherein the primitive network function circuits in the second integrated circuit die optionally further comprises a transportation encryption and decryption hardware accelerator circuit.

Example 12 is the network interface controller of any one of examples 10-11, wherein the primitive network function circuits in the second integrated circuit die optionally further comprises a storage compression and decompression hardware accelerator circuit.

Example 13 is the network interface controller of any one of examples 10-12, wherein the primitive network function circuits in the second integrated circuit die optionally further comprises a network flow search hardware accelerator circuit.

Example 14 is the network interface controller of any one of examples 10-13, wherein the primitive network function circuits in the second integrated circuit die optionally further comprises a flow rate control hardware accelerator circuit.

Example 15 is the network interface controller of any one of examples 10-14, wherein the primitive network function circuits in the second integrated circuit die optionally further comprises a distributed denial of service hardware accelerator circuit.

Example 16 is a programmable integrated circuit, comprising: a host interface operable to communicate with an external host processor; a network interface operable to communicate with a network; a memory interface operable to communicate with an external memory device; and customizable networking circuits configured to communicate with primitive function blocks in an application-specific integrated circuit (ASIC) die stacked under the programmable integrated circuit.

Example 17 is the programmable integrated circuit of example 16, wherein the customizable networking circuits optionally comprise packet buffering and arbitration hardware acceleration circuits.

Example 18 is the programmable integrated circuit of example 17, wherein the packet buffering and arbitration hardware acceleration circuits optionally comprise: ingress arbiter and class of service (CoS) queue circuits; and egress arbiter and class of service (CoS) queue circuits.

Example 19 is the programmable integrated circuit of any one of examples 16-18, wherein the customizable networking circuits optionally comprise a reconfigurable packet processing pipeline.

Example 20 is the programmable integrated circuit of any one of examples 16-19, wherein the customizable networking circuits optionally comprise a programmable interconnect fabric configured to selectively access the primitive function blocks.

Example 21 is an integrated circuit, comprising: memory circuits; and primitive network function circuit blocks at least partially surrounded by the memory circuits, wherein the primitive network function circuit blocks are accessed by customizable networking circuits in a programmable logic device stacked on top of the integrated circuit.

Example 22 is the integrated circuit of example 21, wherein the primitive network function circuit blocks optionally comprise a transportation encryption and decryption circuit.

Example 23 is the integrated circuit of example 22, wherein the transportation encryption and decryption circuit optionally comprises an inline cryptographic engine.

Example 24 is the integrated circuit of any one of examples 21-23, wherein the primitive network function circuit blocks optionally comprise a storage compression and decompression circuit.

Example 25 is the integrated circuit of example 24, wherein the storage compression and decompression circuit optionally comprises a circuit selected from the group consisting of: a remote direct memory access circuit and a look-aside cryptographic engine.

Example 26 is the integrated circuit of any one of examples 21-25, wherein the primitive network function circuit blocks optionally comprise a network flow search circuit.

Example 27 is the integrated circuit of example 26, wherein the network flow search circuit optionally comprises a circuit selected from the group consisting of: a cryptographic transport parser, a small exact match engine, a large exact match engine, and a longest prefix match engine.

Example 28 is the integrated circuit of any one of examples 21-27, wherein the primitive network function circuit blocks optionally comprise a flow rate control circuit.

Example 29 is the integrated circuit of example 28, wherein the flow rate control circuit optionally comprises a circuit selected from the group consisting of: a traffic shaper engine and a meters and statistics engine.

Example 30 is the integrated circuit of any one of examples 21-29, wherein the primitive network function circuit blocks optionally comprise a distributed denial of service circuit.

Example 31 is the integrated circuit of example 30, wherein the distributed denial of service circuit optionally comprises a circuit selected from the group consisting of: a range match engine and a wild card match engine.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. A network interface controller, comprising:
 a first integrated circuit die that includes customizable networking circuits; and
 a second integrated circuit die that includes primitive network function circuits comprising memory circuits and a storage compression and decompression hardware accelerator circuit, wherein the first integrated circuit die is stacked vertically with respect to the second integrated circuit die.

2. The network interface controller of claim 1, wherein the first integrated circuit die comprises a programmable integrated circuit die.

3. The network interface controller of claim 2, wherein the second integrated circuit die comprises an application-specific integrated circuit (ASIC) die.

4. The network interface controller of claim 1, wherein the first integrated circuit die is stacked directly on top of the second integrated circuit die.

5. The network interface controller of claim 1, wherein the second integrated circuit die is stacked directly on top of the first integrated circuit die.

6. The network interface controller of claim 1, wherein the first integrated circuit die comprises:
 a host interface operable to communicate with an external host processor;
 a network interface operable to communicate with a network; and
 a memory interface operable to communicate with an external memory device.

7. The network interface controller of claim 1, wherein the customizable networking circuits in the first integrated circuit die comprises:
 packet buffering and arbitration hardware acceleration circuits.

8. The network interface controller of claim 1, wherein the customizable networking circuits in the first integrated circuit die comprises:
 flexible packet processing pipeline and interconnect circuitry.

9. The network interface controller of claim 1, wherein the customizable networking circuits in the first integrated circuit die comprises:
 a customer application intellectual property (IP) block.

10. The network interface controller of claim 1, wherein the primitive network function circuits in the second integrated circuit die further comprises:
 a transportation encryption and decryption hardware accelerator circuit.

11. The network interface controller of claim 1, wherein the primitive network function circuits in the second integrated circuit die further comprises:
 a network flow search hardware accelerator circuit.

12. The network interface controller of claim 1, wherein the primitive network function circuits in the second integrated circuit die further comprises:
 a flow rate control hardware accelerator circuit.

13. The network interface controller of claim 1, wherein the primitive network function circuits in the second integrated circuit die further comprises:
 a distributed denial of service hardware accelerator circuit.

14. A programmable integrated circuit, comprising:
 a host interface operable to communicate with an external host processor;
 a network interface operable to communicate with a network;
 a memory interface operable to communicate with an external memory device; and
 customizable networking circuits configured to communicate with primitive function blocks in an application-specific integrated circuit (ASIC) die stacked under the programmable integrated circuit, wherein the primitive function blocks comprise a network flow search hardware accelerator circuit.

15. The programmable integrated circuit of claim 14, wherein the customizable networking circuits comprise:
 packet buffering and arbitration hardware acceleration circuits.

16. The programmable integrated circuit of claim 15, wherein the packet buffering and arbitration hardware acceleration circuits comprise:
 ingress arbiter and class of service (CoS) queue circuits; and
 egress arbiter and class of service (CoS) queue circuits.

17. The programmable integrated circuit of claim 14, wherein the customizable networking circuits comprise:
 a reconfigurable packet processing pipeline.

18. The programmable integrated circuit of claim 14, wherein the customizable networking circuits comprise:
 a programmable interconnect fabric configured to selectively access the primitive function blocks.

19. An integrated circuit, comprising:
 memory circuits; and
 primitive network function circuit blocks at least partially surrounded by the memory circuits, wherein the primitive network function circuit blocks are accessed by customizable networking circuits in a programmable logic device stacked on top of the integrated circuit, and wherein the primitive network function circuit blocks comprise a network flow search circuit.

20. The integrated circuit of claim 19, wherein the primitive network function circuit blocks comprise a transportation encryption and decryption circuit.

21. The integrated circuit of claim 20, wherein the transportation encryption and decryption circuit comprises an inline cryptographic engine.

22. The integrated circuit of claim 19, wherein the primitive network function circuit blocks comprise a storage compression and decompression circuit.

23. The integrated circuit of claim 22, wherein the storage compression and decompression circuit comprises a circuit selected from the group consisting of: a remote direct memory access circuit and a look-aside cryptographic engine.

24. The integrated circuit of claim 19, wherein the network flow search circuit comprises a circuit selected from the group consisting of: a cryptographic transport parser, a small exact match engine, a large exact match engine, and a longest prefix match engine.

25. The integrated circuit of claim 19, wherein the primitive network function circuit blocks comprise a flow rate control circuit.

26. The integrated circuit of claim 25, wherein the flow rate control circuit comprises a circuit selected from the group consisting of: a traffic shaper engine and a meters and statistics engine.

27. The integrated circuit of claim 19, wherein the primitive network function circuit blocks comprise a distributed denial of service circuit.

28. The integrated circuit of claim 27, wherein the distributed denial of service circuit comprises a circuit selected from the group consisting of: a range match engine and a wild card match engine.

29. The programmable integrated circuit of claim 14, wherein the primitive function blocks comprise a memory circuit.

30. The programmable integrated circuit of claim 29, wherein the primitive function blocks comprise a storage compression and decompression hardware accelerator circuit.

31. The programmable integrated circuit of claim 14, wherein the primitive function blocks comprise a flow rate control circuit, wherein the flow rate control circuit comprises a circuit selected from a group consisting of: a traffic shaper engine and a meters and statistics engine.

\* \* \* \* \*